3,001,121
RECTIFIER APPARATUS
Charles Kerr, Jr., Edgewood, Pa., assignor to Westinghouse Electric Corporation, East Pittsburgh, Pa., a corporation of Pennsylvania
Filed Apr. 24, 1958, Ser. No. 730,670
5 Claims. (Cl. 321—8)

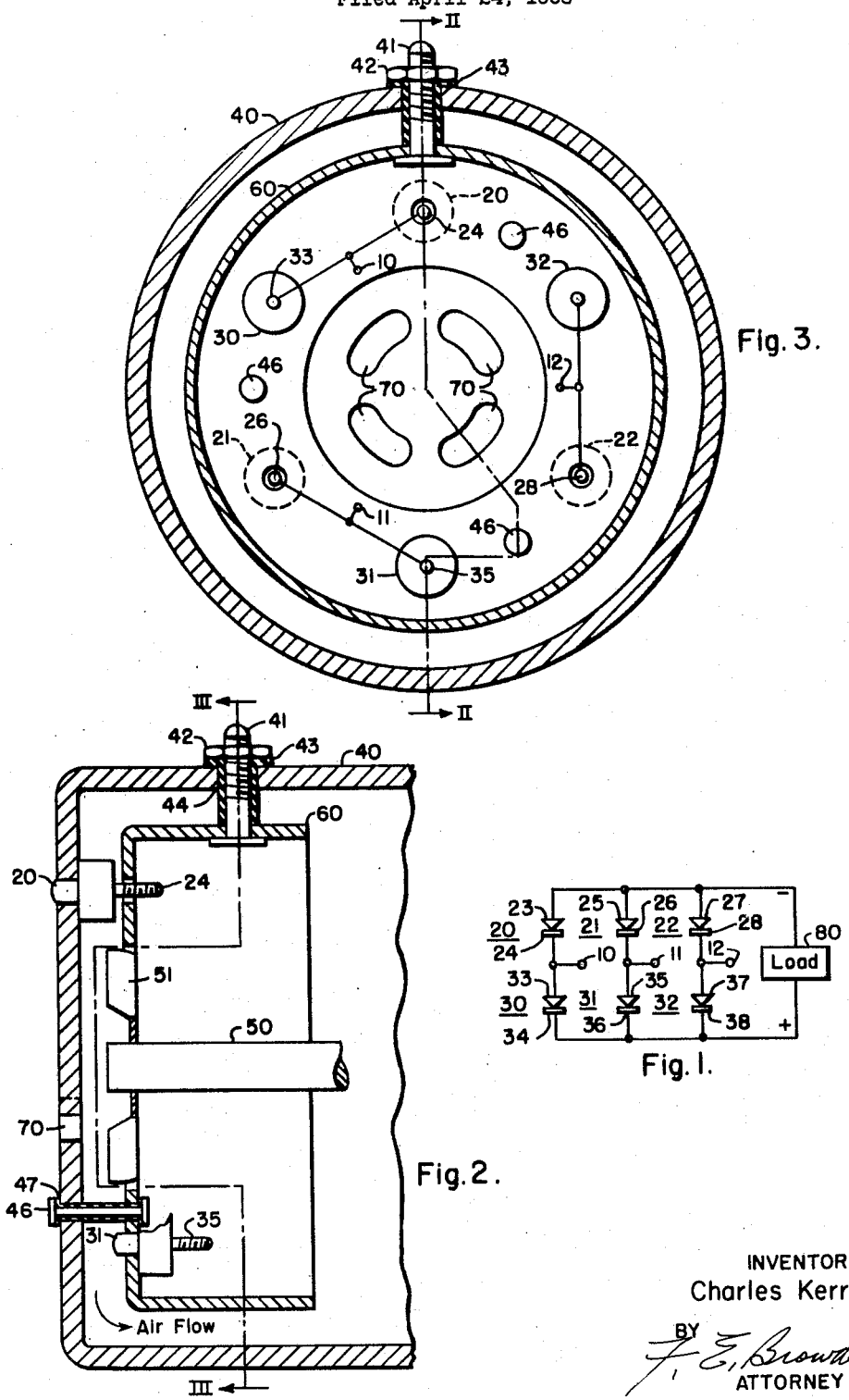

This invention relates to rectifier apparatus in general, and in particular to rectifier apparatus for use with automobile alternators and the like.

Today's vehicles with more electrical apparatus being utilized than ever before thereon are having their ignition and electrical systems designed to operate with alternators as the principal source of power. To utilize these alternators, it is necessary to have some sort of rectifier apparatus in order to change that electrical energy, not being used as alternating-current, to direct-current for driving a portion of the electrical apparatus on the vehicle and also for recharging the storage batteries commonly associated with said ignition and electrical systems.

In designing a rectifier apparatus to be utilized with vehicle alternators and the like, several factors must be considered. The rectifier diodes must be protected from possible mechanical damage. Space, particularly alternator or generator length, is at a premium. An effective heat sink must be provided to dissipate the heat generated in rectification and, if possible, a cooling system for this heat sink should be provided.

It is an object of this invention to provide an improved rectifier apparatus.

It is another object of this invention to provide an improved rectifier apparatus in accordance with the design considerations enumerated above.

Further objects of this invention will become apparent from the following description when taken in conjunction with the accompanying drawings. In said drawings, for illustrative purposes only, there is shown a preferred embodiment of this invention.

FIGURE 1 is a schematic diagram of a three-phase rectifier bridge;

FIG. 2 is a cross-sectional view taken along section line II of FIG. 3 of an apparatus embodying the teachings of this invention; and FIG. 3 is a cross-section taken along the section line III of FIG. 2.

Referring to FIG. 1, there is shown a three-phase full-wave rectifier bridge connection as is commonly known and used in the art. A rectifier 20 and a rectifier 30 are connected in series circuit relationship across a load 80. A rectifier 21 and a rectifier 31 are connected in series circuit relationship across the load 80. A rectifier 22 and a rectifier 32 are connected in series circuit relationship across the load 80.

The rectifiers 20, 21, 22, 30, 31, 32 have anodes 23, 25, 27, 33, 35 and 37, respectively, and cathodes 24, 26, 28, 34, 36 and 38, respectively. The cathode 24 and the anode 33 are connected to a terminal 10. The cathode 26 and the anode 35 are connected to a terminal 11. The cathode 28 and the anode 37 are connected to a terminal 12. A three-phase alternating current source, not shown, is thereby applied to the junction terminal 10, 11 and 12. The operation of this three-phase full-wave rectifier bridge is well known to those skilled in the art and will provide a voltage across the load 80 with a polarity as shown in FIG. 1.

Referring to FIG. 2, there is shown a cross-section of the rectifier apparatus embodying the teachings of this invention. An outer housing member 40 may be an end cap or a portion of the main housing of an alternator or generator; said alternator providing alternating power having at least one phase to the rectifier circuit. The outer housing 40 may be of any of the metals commonly used in constructing the present-day alternator and generator housing. As may be seen by referring to FIG. 3, the outer housing member 40 is cylindrically shaped with one closed end. Within this closed end is mounted an inner housing member 60 which is comprised of copper, aluminum or other electrical conductive metal. The inner housing 60, as well as the outer housing 40, must be of electrically conductive metal which may be steel or any other suitable metal as long as the heat sink for the rectifier apparatus functions efficiently to cool the rectifier apparatus and conduct the heat away.

The inner housing 60 is mounted within the outer housing 40 as shown in FIG. 2 by bolts, rivets or other suitable well-known means 46 which are enclosed in an insulating material 47. The outer housing 40 is thus utilized to form one side of the rectifier circuit shown in FIG. 1 and will be assumed to be the negative side of the circuit shown in FIG. 1, although a reversal of polarities is possible. The inner housing 60 will form the positive side of the circuit shown in FIG. 1 although it may be reversed to the negative side.

Although the members 40 and 60 have been shown as bell-shaped housings, the teachings of this invention may be applied by shaping, constructing or forming metal members that will fit within and be supported by an alternator or generator housing. For example, the members 40 and 60 may be shaped as concentric metal ring-type members to be placed adjacent to each other and around an armature shaft. One ring may be grounded to the alternator housing.

A plurality of rectifier diodes, or three diodes as per the embodiment shown in FIG. 1, are fastened mechanically and electrically to the outer housing 40 either by a pressed fit as shown in FIG. 2, riveting pipe threads, bolts or other means well known to those skilled in the art. The spacing of the diodes 20, 21 and 22 chosen for this embodiment may be seen by referring to FIG. 3. The rectifier diodes 20, 21 and 22 may be of silicon or germanium, or other solid-state rectifying material, and are constructed so that the case of the diodes 20, 21 and 22 also forms and provides the anode connections 23, 25 and 27, respectively. With this arrangement, no negative or anode leads from the diodes 20, 21 and 22 are required to the negative side of the circuit shown in FIG. 1. Since it is common practice for the negative side of the electrical systems of many vehicles to be grounded, the embodiment shown may be so connected.

The smaller housing 60 mounted within the outer housing 40 has, as hereinbefore described, been supported and insulated from the outer housing 40 by insulated bolts, rivets, or other means well known to those skilled in the art. The diodes 30, 31 and 32 are mounted on the inner housing 60 with a spacing chosen for this embodiment as shown in FIG. 3. The diodes 30, 31 and 32 may be silicon or germanium, or any other suitable solid-state rectifying material. The diodes 30, 31 and 32 are constructed so that each of their cases also forms and provides a cathode connection 34, 36 and 38, respectively. Thus, by electrically and mechanically attaching the cathode connections of the diodes 30, 31 and 32 to the inner housing 60 either by press fitting as shown in FIG. 2, riveting pipe threads, bolts, or other means well known in the art, no positive leads are required as shown in FIG. 1. Since the diodes 30, 31 and 32 have been constructed so that their case forms an anode connection, no positive or anode leads are required and the inner housing 60 forms the positive side of the bridge circuit shown in FIG. 1.

Access to the positive side of the bridge shown in FIG. 1, which is the inner housing 60, from outside the outer housing 40 is attained by inserting a stud or terminal 41 through an aperture 44 of the outer housing 40. An insulating member 43 is also inserted within the aperture 44 of the outer housing 40 to electrically insulate the stud 41 from the outer housing 40. The stud 41 may be retained in position by any one of a number of means, the method shown in FIG. 2 being that of threading the stud and screwing a nut 42 over the externally protruding portion of the stud 41 which will not only keep the stud 41 in position, but will also draw the stud into better electrical contact with the inner housing 60. Although the nut and thread arrangement is shown in the apparatus of FIGS. 2 and 3, there are several other means of retaining the stud in position and also attaining a good electrical contact between the stud 41 and the inner housing 60 that are well known to those skilled in the art.

For even more effective heat sink purposes in the rectifier apparatus shown in FIG. 2, a fan 51 may be attached to the shaft 50 of the armature of the generator or alternator. As indicated in the drawings, air flow between the inner and outer housing 60 and 40, respectively, is attained which, in cooperation with the fan mounted at the other end of an alternator or generator, provides complete ventilation of both the rectifier apparatus and the generator or alternator. Apertures 70 may be bored, pressed or formed in a suitable manner in the housing 40 to provide additional air inlets and cooling.

Referring to FIG. 3, there is shown a cross-section of the rectifier apparatus as taken at the points A—A of FIG. 2. The view of FIG. 3 shows the spacing relations of the diodes 20, 21, 22, 30, 31 and 32. The electrical connections for the anodes and cathodes, with like reference characters, are shown as illustrated in the schematic of FIG. 1. The view of FIG. 3 shows the reduced amount of wiring required for low cost and the space-saving arrangement of the mountings of the diodes. A clear view is also shown of the apertures 70 which may be included in the outer housing 40 for more complete ventilation of the rectifier apparatus and the generator or alternator proper.

From the foregoing description and diagrams, the advantages of the teachings of this invention are as follows. The rectifier apparatus is completely enclosed in the generator or alternator case or housing, protecting the rectifying diodes from possible mechanical damage. The generator or alternator end bell or outer housing is utilized to form one side of the electrical bridge and as a support for three of the diodes. Space required by the rectifier apparatus has been cut to a minimum. Since the inner and outer housings form two sides of the bridge, the cost is low for the large heat sinks provided permitting the use of steel, for example, rather than copper or aluminum or other higher-priced and more fragile metals. The combination of the inner and outer housings forms an excellent air path directing the flow of the air for maximum cooling benefits.

Although the embodiment disclosed in this invention has shown the teachings only in connection with a three-phase, full-wave rectifier apparatus, it is not to be confined to such since the teachings would apply to single-phase or other polyphase rectifier apparatus applications.

In conclusion, it is pointed out that while the illustrated example constitutes a practical embodiment of my invention, I do not limit myself to the exact details shown, since modification of the same may be varied without departing from the spirit and scope of the invention.

I claim as my invention:

1. In a rectifier apparatus; in combination; an outer metal housing; an inner metal housing; means supporting said inner housing within said outer housing with said inner housing electrically insulated from said outer housing; a first plurality of rectifier diodes each having an anode connection and a cathode connection; a second like plurality of rectifier diodes each having a cathode connection and an anode connection; means electrically and mechanically connecting said cathode connections of said first plurality of diodes to one of said metal housings; and means electrically and mechanically connecting said anode connections of said second plurality of diodes to the other of said metal housings, means connecting the anode of each of said first plurality of diodes to a cathode of one of said second plurality of diodes to provide a plurality of associated pairs of diodes, means for applying an alternating current voltage to each of said associated pairs of diodes, means connecting the outputs of said associated pairs of diodes in parallel circuit relationship, and means comprising said outer and inner metal housings for obtaining a direct current voltage from said parallel connected pairs of diodes.

2. In a rectifier apparatus; in combination; an outer metal housing; an inner metal housing; means supporting said inner housing within said outer housing with said inner housing electrically insulated from said outer housing; a first plurality of rectifier diodes each having an anode connection and an encasing means operative to provide a cathode connection; a second like plurality of rectifier diodes each having a cathode connection and an encasing means operative to provide an anode connection; means electrically and mechanically connecting said cathode connections of said first plurality of diodes to one of said metal housings; and means electrically and mechanically connecting said anode connections of said second plurality of diodes to the other of said metal housings; means connecting the anode of each of said first plurality of diodes to a cathode of one of said second plurality of diodes to provide a plurality of associated pairs of diodes, means for applying an alternating current voltage to each of said associated pairs of diodes, means connecting the outputs of said associated pairs of diodes in parallel circuit relationship, and means comprising said outer and inner metal housings for obtaining a direct current voltage from said parallel connected pairs of diodes.

3. In a rectifier apparatus; in combination; an outer metal housing; an inner metal housing; means supporting said inner housing within said outer housing with said inner housing electrically insulated from said outer housing; a first plurality of rectifier diodes each having an anode connection and a cathode connection; a second like plurality of rectifier diodes each having a cathode connection and an anode connection; means electrically and mechanically connecting said cathode connections of said first plurality of diodes to one of said metal housings; and means electrically and mechanically connecting said anode connections of said second plurality of diodes to the other of said metal housings; the anode of each diode from said first plurality being electrically connected to the cathode of a diode from said second plurality to provide a plurality of associated diode pairs; and means providing an alternating current voltage; circuit means connecting said alternating voltage to said anode-cathode junction of each of said associated diode pairs, and means comprising said outer and inner metal housings for obtaining a direct current output from said associated diode pairs.

4. In rectifier apparatus for use with alternators and the like, in combination; an outer metal alternator housing; an inner metal housing; means supporting said inner housing within said outer housing with said inner housing electrically insulated from said outer housing; a first plurality of rectifier diodes each having an anode connection and a cathode connection; a second like plurality of rectifier diodes each having a cathode connection and an anode connection; means electrically and mechanically connecting said cathodes of each of said first plurality of diodes to one of said metal housings; means electrically and mechanically connecting each of said anodes of said second plurality of diodes to the other of said metal housings; means connecting the anode of each of said first plurality of diodes to a cathode of one of said second plurality of diodes to provide a plurality of associated pairs of diodes, means for applying an alternating current voltage to each of said associated pairs of diodes, said inner and outer metal housings providing circuit connections for obtaining a direct current voltage output from said plurality of associated pairs of diodes.

5. In rectifier apparatus for use with alternators and the like, in combination; an alternator having an armature shaft and providing at least one phase of alternating current voltage; an outer metal alternator housing; an inner metal housing; means supporting said inner housing within said outer housing with said inner housing electrically insulated from said outer housing; a first plurality of rectifier diodes each having an anode connection and a cathode connection; a second like plurality of rectifier diodes each having a cathode connection and an anode connection; means electrically and mechanically connecting said cathode connections of said first plurality of diodes to one of said metal housings; means electrically and mechanically connecting said anode connections of said second plurality of diodes to the other of said metal housings; means connecting the anode of each of said first plurality of diodes to a cathode of one of said second plurality of diodes to provide a plurality of associated pairs of diodes, means for applying an alternating current voltage from said alternator to each of said associated pairs of diodes, said inner and outer metal housings forming two sides of an electrical bridge network for obtaining a direct current voltage output from said associated pairs of diodes; and a fan member mounted on said armature shaft being disposed to provide air circulation and ventilation in air paths formed by said inner and outer housings.

References Cited in the file of this patent

UNITED STATES PATENTS

| | | |
|---|---|---|
| 2,383,669 | Moore | Aug. 28, 1945 |
| 2,497,141 | Schultz | Feb. 14, 1950 |
| 2,665,334 | Brainard | Jan. 5, 1954 |